(12) United States Patent
Schultz et al.

(10) Patent No.: US 8,661,144 B2
(45) Date of Patent: Feb. 25, 2014

(54) METHOD AND SYSTEM FOR AUTOMATED USER AUTHENTICATION FOR A PRIORITY COMMUNICATION SESSION

(75) Inventors: Paul T. Schultz, Colorado Springs, CO (US); Mark J. Hahn, Stow, MA (US); Robert A. Sartini, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 179 days.

(21) Appl. No.: 13/209,736

(22) Filed: Aug. 15, 2011

(65) Prior Publication Data
US 2013/0047227 A1 Feb. 21, 2013

(51) Int. Cl.
*G06F 15/16* (2006.01)
(52) U.S. Cl.
USPC ............... 709/228; 709/227; 726/3; 726/4; 726/7
(58) Field of Classification Search
USPC ............... 709/227, 228; 726/2, 3, 7, 21, 4; 455/435.3; 370/235
See application file for complete search history.

(56) References Cited

U.S. PATENT DOCUMENTS

| 6,636,894 B1* | 10/2003 | Short et al. ............ 709/225 |
| 2010/0115106 A1* | 5/2010 | Moriwaki et al. ........ 709/227 |
| 2011/0023086 A1* | 1/2011 | Goldman et al. ........... 726/3 |
| 2011/0202666 A1* | 8/2011 | Heidermark et al. ...... 709/227 |
| 2011/0295996 A1* | 12/2011 | Qiu et al. ............... 709/224 |
| 2013/0024916 A1* | 1/2013 | Evans ..................... 726/5 |

\* cited by examiner

*Primary Examiner* — Frantz Jean

(57) ABSTRACT

An approach is provided for automated user authentication for a priority communication session. An authentication platform receives a session request for establishing a priority communication session over a data network between a user device and a service platform. The authentication platform determines network information and device information associated with the session request and the user device, respectively. The authentication platform further determines user history information regarding one or more prior communication sessions of a user of the user device. The authentication platform authenticates the user based on the network information, the device information, and the user history information for establishing the priority communication session.

20 Claims, 8 Drawing Sheets

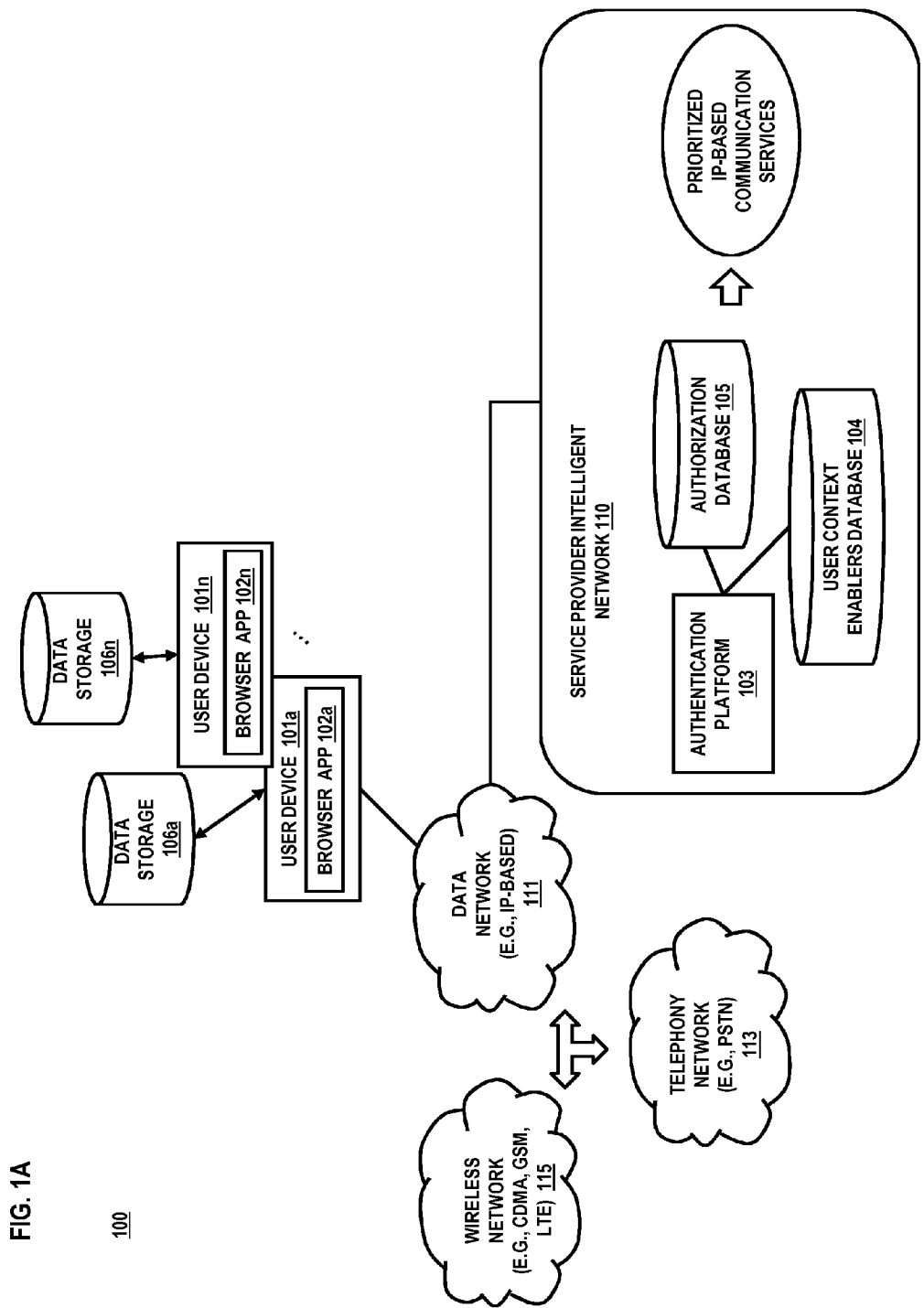

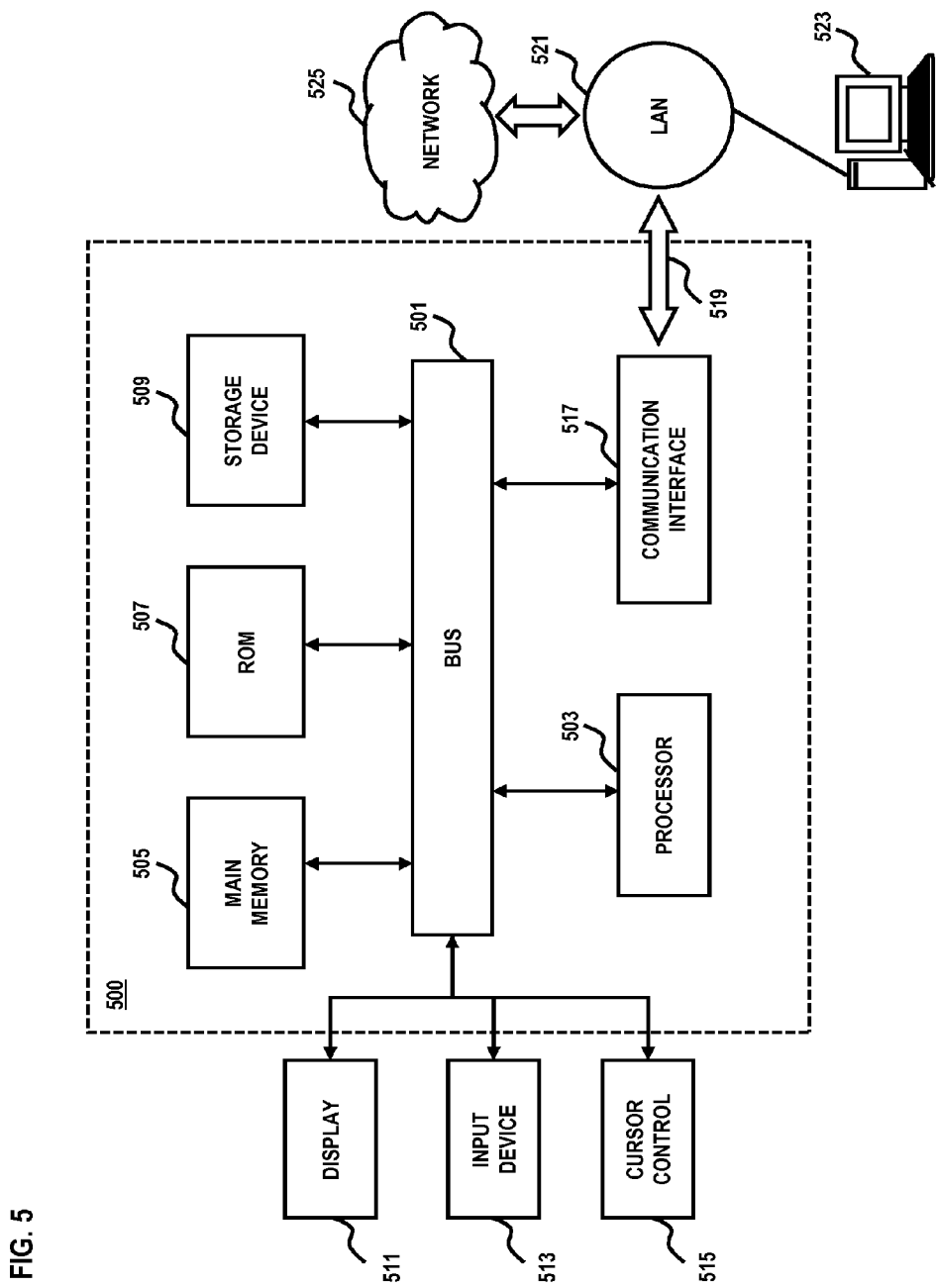

METHOD AND SYSTEM FOR AUTOMATED USER AUTHENTICATION FOR A PRIORITY COMMUNICATION SESSION

BACKGROUND INFORMATION

Intelligent network services are becoming more and more prevalent, especially with the continued expansion of communications services and the proliferation of mobile phones (e.g., smartphones) and ever expanding suite of communications and mobile phone applications and services. Service providers offer a wide variety of network services, over intelligent networks, such as video services, audio services, Quality of Service (QOS) services, emergency services, and the like. Such emergency services may comprise personal emergency response services (PERS) or government emergency telecommunications service (GETS), which may be accessible, for example, on a priority basis. With many such network services, it is necessary for the service provider network to authenticate a user as being a subscriber or otherwise permitted to access a given service, such as through the entry of a user identifier/identification (ID) and password. Authentication is especially important in the case of high priority services, where the service bandwidth is prioritized over the traffic for other non-priority services. Unfortunately, however, in the case of priority services, such as the GETS emergency service or the PERS service, authentication can be overly burdensome and time consuming in situations where the user may be preoccupied with critical issues, and requires relatively instant access to the service.

Based on the foregoing, there is a need for an effective and reliable way to authenticate users for access to network services without burdening the user with authentication tasks prior to granting access to the required services.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 1A and 1B illustrate, respectively, a diagram of a system for authenticating users for access to network services of a service provider intelligent network, and a diagram of components of the service provider intelligent network, according to various embodiments;

FIG. 5 is a diagram of a computer system that can be used to implement various exemplary embodiments.

DESCRIPTION OF THE PREFERRED EMBODIMENT

An apparatus, method and software providing for automated user authentication, for access to network services of a service provider intelligent network, through a priority communication session is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1B:
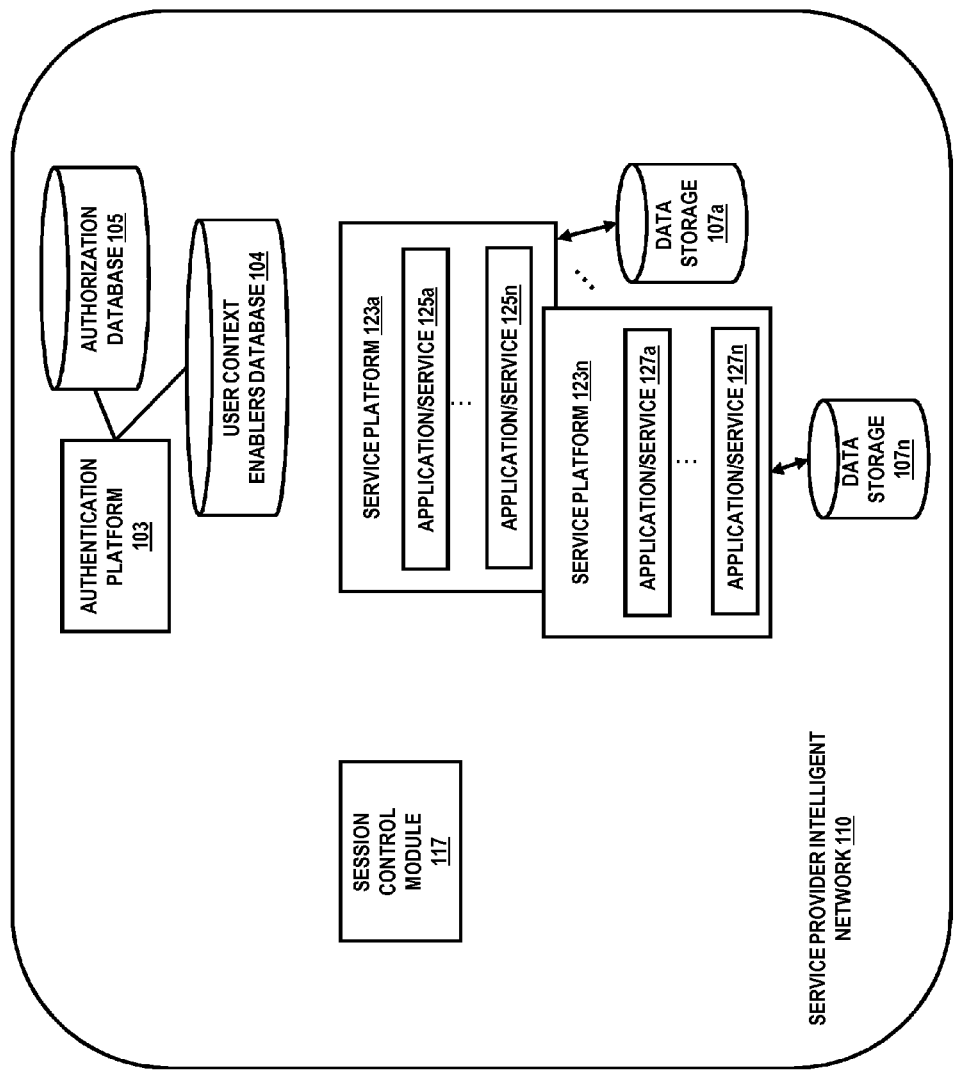

FIGS. 1A and 1B illustrate, respectively, a diagram of a system for authenticating users for access to network services of a service provider intelligent network, and a diagram of components of the service provider intelligent network, according to various embodiments. System 100 includes user devices 101a-101n via which users access various services of the service provider intelligent network 110. In certain embodiments, user device 101 may be any type of mobile terminal, fixed terminal, or portable terminal including a mobile handset, station, unit, device, multimedia computer, multimedia tablet, Internet node, communicator, desktop computer, set-top box (e.g., television system), laptop computer, Personal Digital Assistants (PDAs), smartphone or any combination thereof. It is contemplated that these services of the service provider may include providing or otherwise invoking one or more applications to the user (or subscriber).

According to an example embodiment, the service provider intelligent network 110 also includes an authentication platform 103, which performs the user authentication process for access to the network services of the service provider intelligent network 110. The user authentication platform 103 interfaces with a user context enablers database 104, for authenticating a user based on certain information determined from a session initiation request. In certain embodiments, the network services include priority communication sessions for providing emergency services, such as Personal Emergency Response System (PERS) services, Government Emergency Telecommunications Services (GETS), and other similar emergency telecommunications services. By way of example, the authentication platform 103 can perform many (if not all) of the user authentication process functions in the background. In other words, to the maximum extent feasible (taking into account security and reliability of the user authentication), the authentication process functions are performed as background steps during initiation of a communications session, prior to engaging the user. Accordingly, the user authentication process, for access to the network services of the service provider intelligent network 110, with minimized user interaction, according to certain embodiments, streamlines any user interaction involved in the communications session setup and user authentication process. Certain embodiments thereby facilitate secure and reliable user authentication processes, in a streamlined and efficient matter, with minimal interaction with or burden on the user.

In various embodiments, system 100 further encompasses one or more communications networks, e.g., data network 111 telephony network 113, and wireless network 115, by which the user devices 101 communicate with the service provider intelligent network 110, for accessing services. Data network 111, in one embodiment, is an Internet Protocol (IP)-based network. However, it is contemplated that network 111 other data protocols/technologies may be utilized.

As seen FIG. 1B, the service provider intelligent network 110 includes a number of service platforms 123a-123n, which provide various types of services. In one embodiment, these services include prioritizing communication sessions, e.g., in support of emergency communications. As seen, the service platform 123a may provide the services 125a-125n, and the service platform 123n may provide the services 127a-127n. The user device communicates with the service provider intelligent network 110, and accesses desired applications services, through the session control module 117. A user device 101 accesses the service provider intelligent network 110 via a communications session, controlled by the session control module 117, over one or more of the networks 111, 113 and 115, and initiates a communications session through a session initiation request.

In certain embodiments, as part of the user authentication process, the user authentication platform 103 acquires and analyzes network information, such as information relating to network attach points, Internet Protocol (IP) addresses, and the like, associated with a communication session initiation request, where the communication session is requested for accessing a particular network service (e.g., an application/service 125 on service platform 123a). Based on such network information, the user authentication platform 103 attempts to authenticate the user as authorized to utilize the network application/service being accessed through the requested communication session. For example, the authentication platform 103 compares the IP addresses and other network information against the user context enablers database 104 to confirm that the IP address and/or other network information matches records stored in the database. A match of the network information with records of the user context enablers database 104 would indicate that the respective user is or may be authorized to access the requested network application/service 125, and the access would be granted and the requested communication session could then be established.

In a further embodiment, as part of the user authentication process, the user authentication platform 103 determines and analyzes device information (of the user device 101) that is used to request the communications session and to access the network application/service 125. In certain embodiments, the device information may, for example, include an international mobile equipment identity (IMEI) number and/or an international mobile subscriber identity (IMSI) number. As with the network information, the user authentication platform 103 attempts to authenticate the user as authorized to utilize the requested network application/service 125 by comparing the device information against the user context enablers database 104. A match of the device information with records of the user context enablers database 104 would indicate that the respective user is authorized to access the network application/service 125, and the access would be granted and the requested communication session could then be established. The user device information may be utilized as a basis for user authentication independent of the network information, or in addition to the network information. In the case where the user device information is used as a basis for user authentication in addition to the network information, certain embodiments provide for further security assurances in the authentication process.

In yet further embodiments, as part of the user authentication process, the user authentication platform 103 may utilize additional authentication parameters as bases for user authentication. For example, the user authentication platform 103 may utilize one or more of location information, user history information, and passive background user identification processes (such as voice recognition and/or voice biometrics). With respect to location information, in one embodiment, user authentication platform 103 determines location information for the user device 101, and attempts to authenticate the user as authorized to utilize the requested network application/service 125 by comparing the location information against the user context enablers database 104. A match of the user device location information with records of the user context enablers database 104 may indicate that the respective user is authorized to access the network application/service 125, and the access would be granted and the requested communication session could then be established. The user device location information may be utilized as a basis for user authentication independent of the network information and/or the user device information, or in addition thereto. In the case where the user device location information is used as a basis for user authentication in addition to the network information and/or the user device information, platform 103 provides for further security assurances in the authentication process, and, again, in a streamlined and efficient manner, with minimal interaction with or burden on the user.

Additionally, in further embodiments, the user authentication platform 103 may "mash up" the user device location information with media information acquired from private network information services, or from public network information services (such as the Internet). In this manner, the user authentication platform 103 acquires current event and news information, and determines locations of current emergency or other situations involving first responder and/or other emergency response services. The user authentication platform 103 can then mash up such current event information with the location information for the user device 101, and determine whether the user device 101 is in the vicinity of any such emergency or other situations based on this conglomeration of information. In some embodiments, such user device location information also indicates direction or heading of the user device 101, and the user authentication platform 103 determines whether the user device 101 is within the vicinity of, or on a route heading towards, any such emergency or other situation. Then, for example, in the event that the user authentication platform 103 determines that the user device 101 is in fact in the vicinity of or heading towards an emergency situation, and that the network application/service 125 being accessed (e.g., the GETS system) relates to the emergency situation, the user authentication platform 103 uses such information as a further basis for authentication of the user. For example, if the user device information indicates that the user is a member of the Federal Emergency Management Agency (FEMA), and the user device 101 is in the vicinity of or heading towards an area struck by a tornado, then the user authentication platform 103 may grant the user access to the GETS system without requiring the entry of a user name and password for authentication. Such arrangement, according to certain embodiments, provides enhanced security, with minimal user interaction.

In further embodiments, the user authentication platform 103 performs a passive authentication, such as user voice recognition and/or voice biometrics. A match resulting from an analysis of the user voice against voice recognition and/or voice biometric information records of the user context enablers database 104 can indicate that the respective user is authorized to access the network application/service 125, and the access would be granted and the requested communication session could then be established. As with the other forms of authentication information, such a passive authentication may be utilized as a basis for user authentication independent of the network information, user device information and/or location information. By utilizing the user device information (or any such other authentication information) in the user authentication process, the authentication platform 103 provides enhance security services. In one embodiment, the above procedure employs a voice session, whereby the authentication is "progressive." That is, the user can initiate the voice session upon which voice recognition/voice biometric can be performed, and followed by additional service (e.g., addition of video).

In a further embodiment, once it is determined that a respective user is authorized to access a network application/service 125, and the access is granted and the requested communication session could then be established, the authentication platform 103 may access specific user information from the authorization database 105 to determine specific authorization parameters regarding the particular services 125 that a particular user is authorized to access. In further embodiments, additional authorization parameters may be determined from the information retrieved from the authorization database 105, such as a level of access for the user with respect to the network application/service 125. Such authorization parameters may further include security clearance level, network access rights (such as user or administrator rights), etc. for the authenticated user. The authorization parameters may be used to configure the specific access and enabled functionality for the user's access to the requested network application/service 125.

As shown in FIG. 1B, the service platforms 123a-123n each may host respective services 125a-125n ... 127a-127n, respectively, by way of one or more servers, host network systems and server applications. An application/service 125 maintains information provided by an interacting user in a respective data store 107, of the data stores 107a-107n, for subsequent processing and use in relation to a communication session utilizing the application/service 125. A user operating a user device 101 may access the services 125a-125n of a service platform 123a, for example, by way of a browser application 102, or by other appropriate means based on the type of application/service 125 being accessed (e.g., e-mail, instant messaging, voice services, video services, etc.).

The user devices 101a-101n (shown in FIG. 1A) can support any type of interface for supporting the presentment of the different services 125a-125n of a service platform 123a, for example. A user device 101 may facilitate various input means for receiving and generating information, including touch screen capability, keyboard and keypad data entry, motion sensing input device, voice-based input mechanisms and the like. Further, a user device may also feature a respective data store 106 for maintaining data provided to it by an application/service 125, for example. Any known and future implementations of user devices 101a-101n are applicable.

IP network 111 may be any suitable wire-line and/or wireless network, and be managed by one or more service providers. For example, in addition to a public switched telephone network (PSTN) as configured by a telephony network 113, network 111 and 115 may include an integrated services digital network (ISDN) or other like network. In the case of a wireless network configuration, networks 113 and 115 may employ various technologies including, for example, code division multiple access (CDMA), enhanced data rates for global evolution (EDGE), general packet radio service (GPRS), mobile ad hoc network (MANET), global system for mobile communications (GSM), long term evolution (LTE), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Further, although depicted as separate entities, networks 111-115 may be completely or partially contained within one another, or may embody one or more of the aforementioned infrastructures. It is further contemplated that networks 111-115 may include components and facilities to provide for signaling and/or bearer communications between the various components or facilities of system 100. In this manner, they may embody or include portions of a signaling system 7 (SS7) network, IMS network, or other suitable infrastructure to support control and signaling functions.

As noted above, certain priority communications sessions, supporting access to service provider network services, may comprise communications sessions for accessing emergency communications services, such as a PERS system and the federal government GETS system. In such cases, access to the systems and the subsequent data and voice communications may be extremely time-critical, where any instances of delay may be detrimental to underlying emergency operations. Accordingly, oftentimes the user cannot and/or should not be burdened with initial authentication operations to establish the communications session with the emergency service platform. To address this issue, system 100 introduces an authentication platform 103 for performing user authentication functions for access to network services (e.g., PERS systems, GETS system, etc.) that require authentication prior to access.

According to example embodiments, the authentication platform 103 is configured to perform such user authentication functions as background processes during the initiation and setup of a requested priority communication session for accessing the requested network application/service 125. The authentication platform 103 utilizes captured, detected or acquired information, such as network information, user device information, user device location information, user context enablers, voice information, challenge response information, and the like to perform a secure user authentication. Further, the authentication is performed as a background process, with minimal user interaction. Certain embodiments thereby provide for security assurances in the authentication process, and perform the authentication function in a streamlined and efficient manner, with minimal interaction with or burden on the user.

Figure 2:
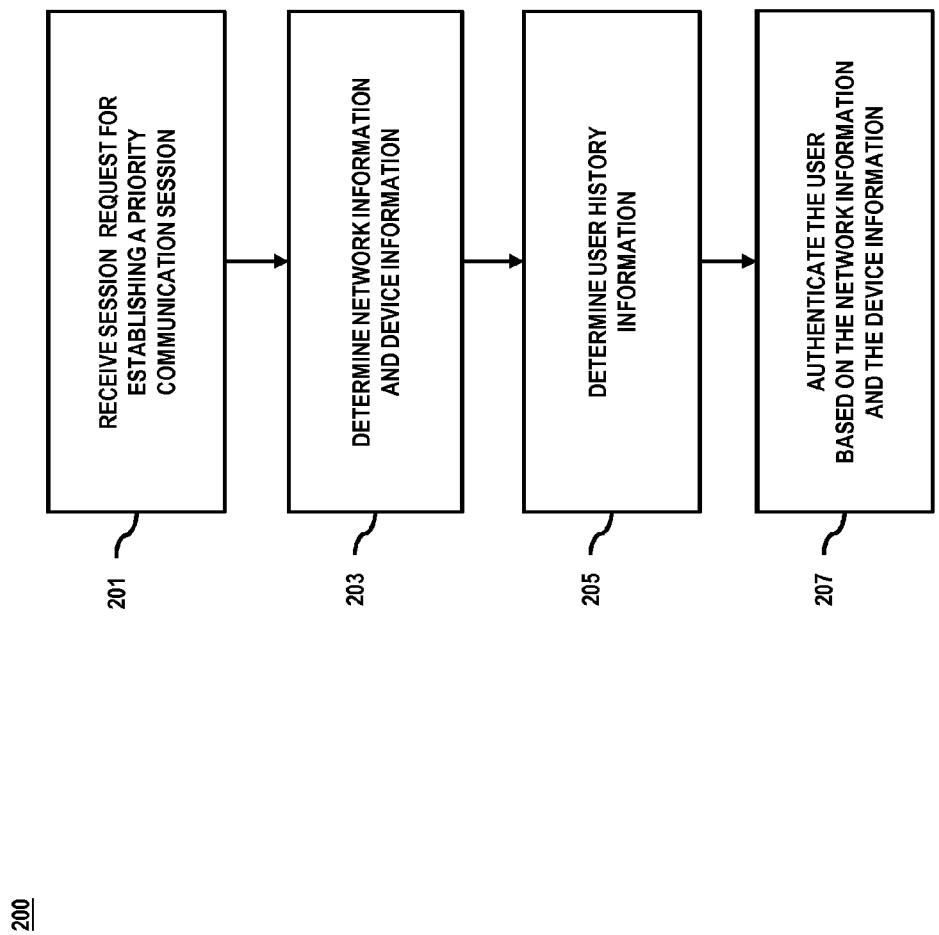
FIG. 2 is a flowchart of an authentication process pertaining to prioritized communications, according to one embodiment.

FIG. 2 is a flowchart of an authentication process pertaining to prioritized communications, according to one embodiment. In step 201, process 200 involves a session request being received for establishing a priority communication session over data network 111 between a user device 101 and a service platform 123. In step 203, process 200 then determines network information and device information associated with the session request and the user device, respectively. As mentioned, in some embodiments, network information includes network addresses (e.g., IP addresses) as well as information about network attach points. The device information, in certain embodiments, includes unique equipment identifiers, such as an international mobile equipment identity (IMEI) number and/or an international mobile subscriber identity (IMSI) number.

User history information is determined, as in step 205, for one or more prior communication sessions of a user of the user device and/or the user device. According to one embodiment, user history information specifies past behavior or activities of the user in the context of the applications and services of platform 123. Next, in step 207, the user is authenticated based on the network information and the device information, and on the user history information, for establishing the priority communication session.

Figure 3:
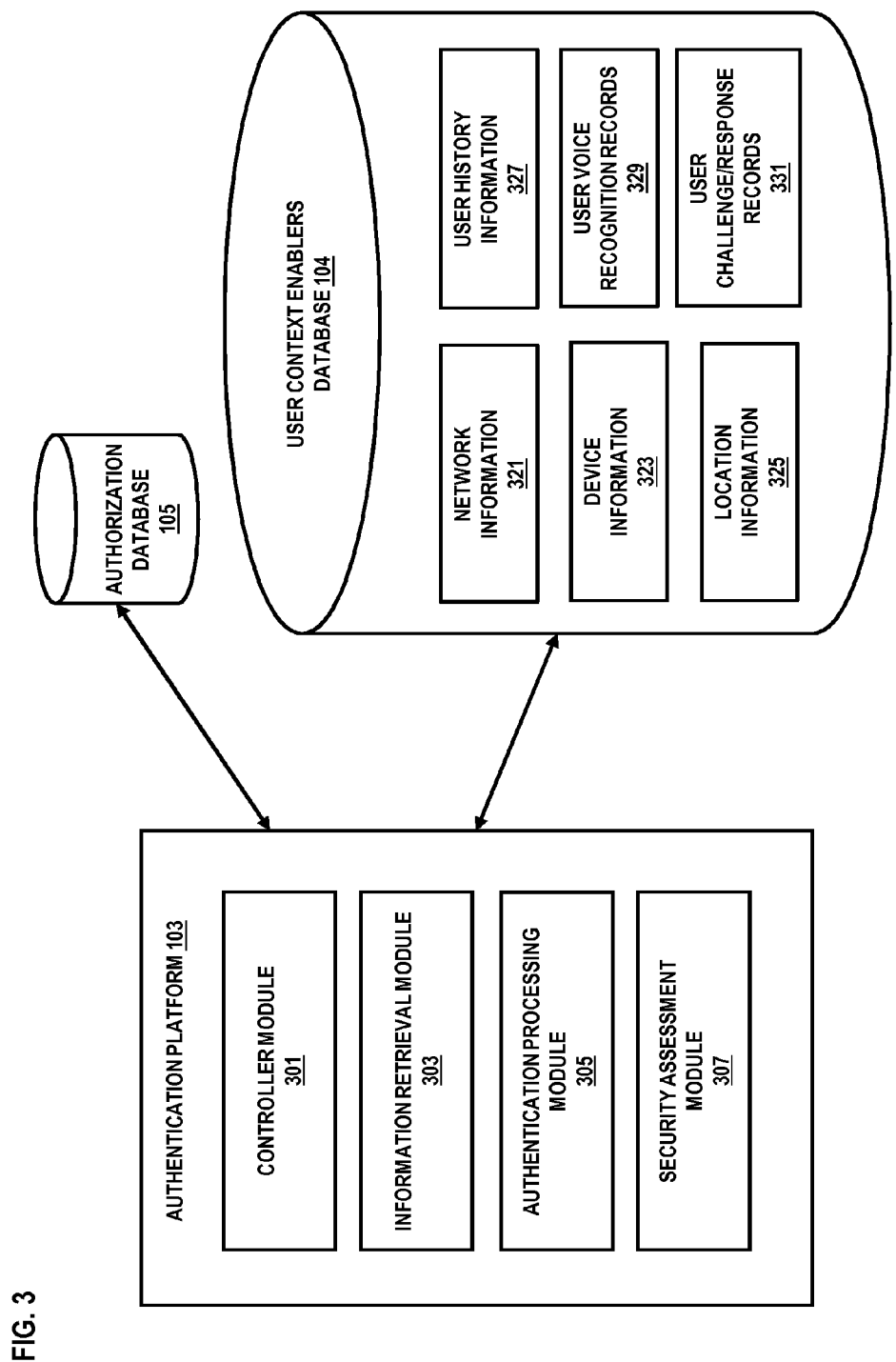
FIG. 3 is a diagram of an authentication platform utilized in the system of FIG. 1, according to one embodiment.

FIG. 3 is a diagram of an authentication platform utilized in the system of FIG. 1, according to one embodiment. The authentication platform 103 includes various executable modules for performing one or more computing, data processing and network based instructions that in combination provide a means for performing the user authentication functions of certain embodiments. Such modules can be implemented in hardware, firmware, software, or a combination thereof. For example, according to one embodiment, the authentication platform 103 includes a controller module 301, which controls the overall functioning of, and data communication within and inputs and outputs to and from, the controller module 301. The controller module 301 may comprise a microcontroller and associated storage, for storing of the software/firmware to be executed by the microcontroller for performance of the control functions. By way of further example, the authentication platform 103 may include an information retrieval module 303, an authentication processing module 305 and a security assessment module 307. It is noted that these modules perform various tasks for enabling the authentication processes in accordance with various embodiments.

In one embodiment, the service provider intelligent network 110 receives session initiation requests for priority communications sessions for accessing emergency communications services. Upon receipt of a session initiation request, service provider intelligent network 110 generates an authentication request and routes the authentication request to the authentication platform 103, wherein it is received by the controller module 301. The session initiation request may include a request for the establishment of a priority communications session, through one or more of the networks 111-115, between a user device 101 and a service platform 123 of the service provider intelligent network 110. The priority communications session may, for example, be for support of a network application/service 125 available on the service platform 123, such as an emergency telecommunications service. In the case where the network application service requires authentication for the user access, the authentication platform performs the authentication process function.

Upon receipt of the session initiation request, in one embodiment, the information retrieval module 303 acquires the requisite information for support of the authentication process. In one embodiment, for example, the information retrieval module 303 acquires the network information associated with the session initiation request. In further embodiments, the information retrieval module 303 acquires the device information for the user device 101 from where the session initiation request originated. In alternative embodiments, where the authentication process utilizes additional authentication parameters as bases for authentication, the information retrieval module 303 acquires such additional information, such as location information, and user history information.

The authentication platform 103, according to one embodiment, also includes the user context enablers database 104, which stores information with respect to authorized users. Information, such as location, may also be acquired in real time. The platform 103, in certain embodiments, has the ability to gather information via real-time queries in addition or alternative to database 104. In one embodiment, the user context enablers database 104 stores network information 321, device information 323, location information 325, user history information 327, user voice recognition and/or voice biometric records 329 and user challenge/response records 331. The stored information and records correspond with respective users who are authorized to access one or more application/services 125. Once the requisite information is acquired, the information is sent to the authentication processing module 305, which performs the data analysis against the corresponding user context enablers stored in the user context enablers database 104. For example, the authentication processing module 305 is configured to evaluate acquired network information against network information 321 of authorized users stored in the user context enablers database 104. Similarly, the authentication processing module 305 is configured to evaluate acquired device information, device location information and user history information against device information 323, device location information 325 and user history information 327 stored in the user context enablers database 104 with respect to authorized users. Further, the authentication processing module 305 is configured to evaluate acquired user voice information and user challenge/response information against user voice recognition and/or voice biometric records 329 and user challenge/response records 331 stored in the user context enablers database 104 with respect to authorized users. Once a user is authenticated, in one embodiment, the authentication processing module 305 then retrieves the respective specific user information from the authorization database 105 to determine the specific authorization parameters regarding the services 125 that the authenticated user is authorized to access, and further may retrieve additional authorization parameters, such as a level of access for the user with respect to the network services 125, and security clearance levels for the authenticated user.

In a further embodiment, the authentication platform 103 also includes a security assessment module 307. The security assessment module 307 determines the authentication process steps that resulted in an authentication indication and that resulted in a failed authentication. The security assessment module 307 then assesses the level of security attained based on the results of the authentication process steps, and determines whether the attained security level is sufficient for the requested application/service. In making this determination, the security assessment module may be configured with algorithms and/or fuzzy logic to make an appropriate determination in view of the sensitivity and security requirements of the requested application/service. Once the security assessment module 307 makes the requisite security determination, it passes the determination on to the authentication processing module 305, which uses the determination as a basis for the user authentication. Alternatively, the security assessment module 307 may make a determination regarding required authentication steps for a particular application/service prior to the performance of an authentication process for a particular user, based on predetermined authentication criteria for the application/service.

Figure 4A:
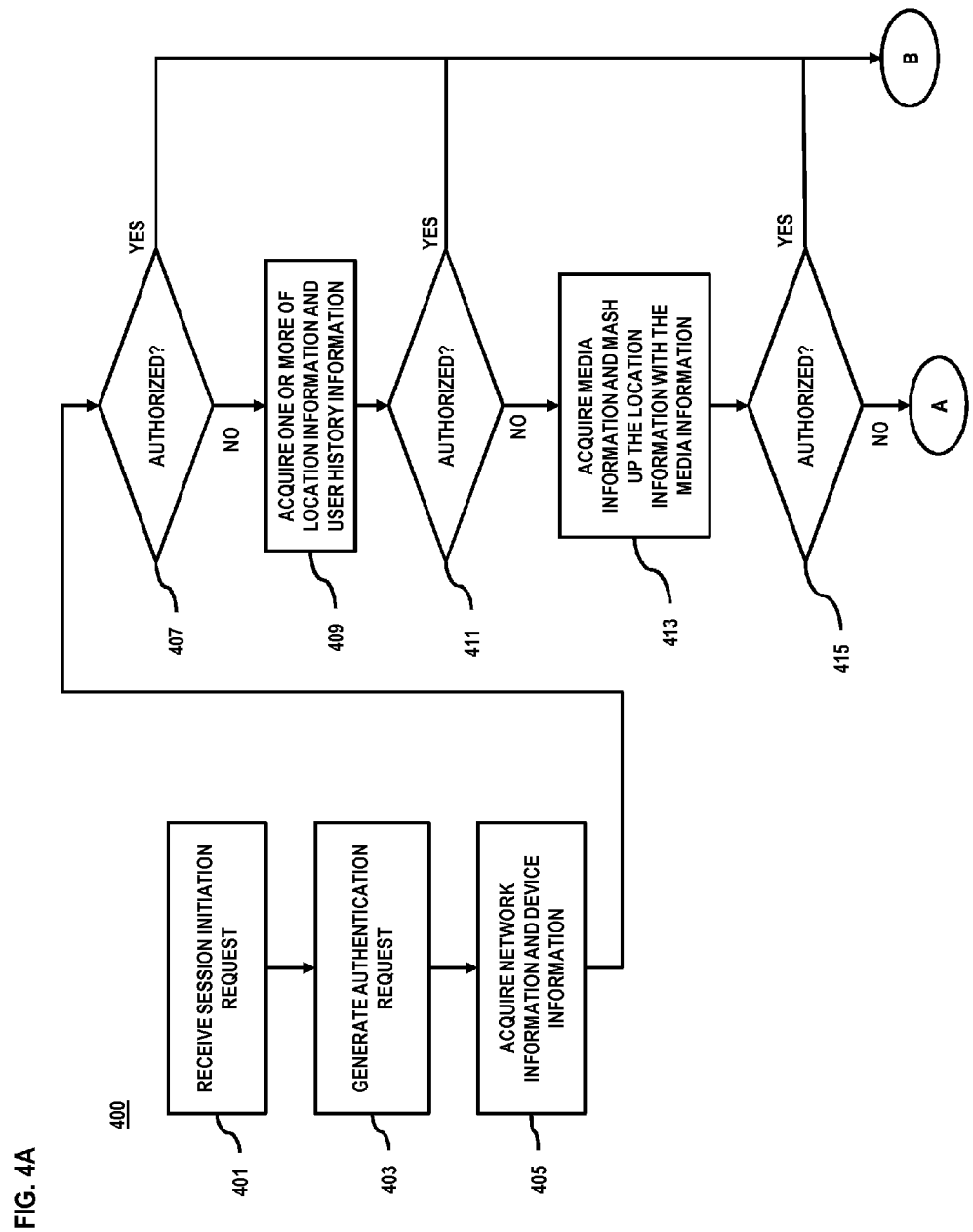
FIGS. 4A and 4B are a flowchart regarding a process for authenticating a user for establishing a communication session for access to network services of the service provider intelligent network of FIG. 1A, according to various embodiments.
Figure 4B:
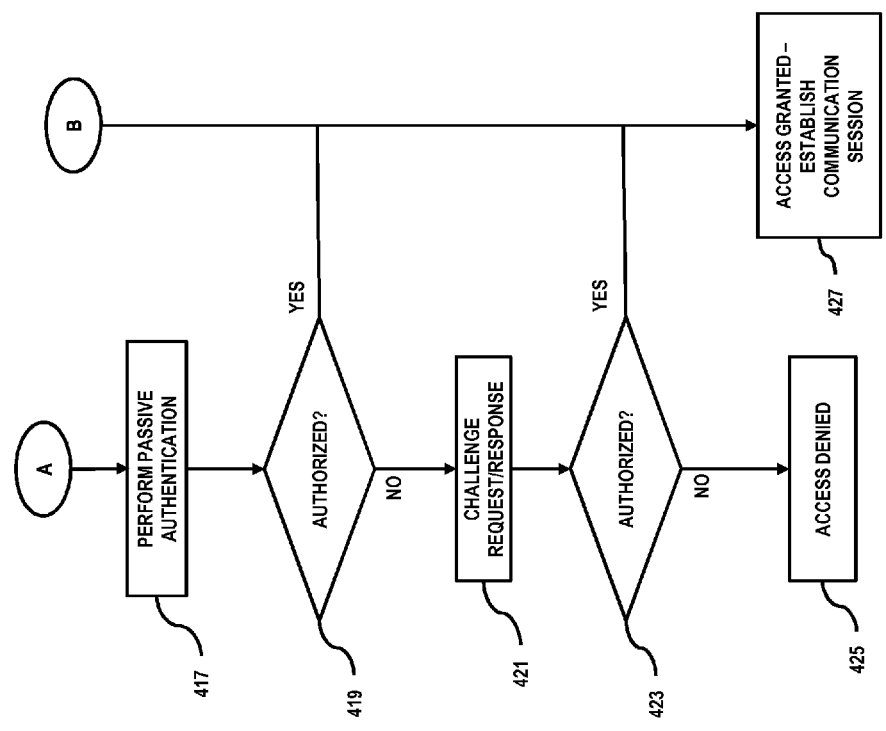

FIGS. 4A and 4B illustrate a flowchart regarding a process for authenticating a user for establishing a communication session for access to network services of a service provider intelligent network 110, according to various embodiments of the present invention. For the purpose of illustration, the processes are described with respect to the system 100 of FIG. 1. The process involves user device 101 accessing a particular application/service of the service provider intelligent network 110. By way of example, the user device 101 connects to the session control module 117 of the service provider intelligent network 110, through one or more of the networks 111-115, and transmits a communication session initiation request for a priority communications session to access an application/service offered by the service provider intelligent network 110 (of FIG. 1A).

Referring first to FIG. 4A, in step 401 of process 400, the service provider intelligent network 110 receives the session initiation request from the user device 101. Upon receipt of the session initiation request, at step 403, process 400 generates an authentication request and routes the authentication request to the authentication platform 103, wherein it is received by the controller module 301. The controller module 301, in response, launches the authentication process. At step 405, the information retrieval module 303 then acquires network information (such as network attach points, IP addresses, and the like) associated with the session initiation request, and/or device information (such as the IMEI number for the user device 101 and/or the IMSI number for the user/subscriber of the user device 101), and passes the network and device information to the authentication processing module 305. The authentication processing module 305, at step 407, in turn analyzes the network and device information against corresponding information for authorized users stored in the user context enablers database 104, and determines whether the user is authorized to access the requested application/service.

If the user authentication fails at step 407, or if further levels of user authentication are required (e.g., for security purposes), then at step 409, the information retrieval module 303 acquires location information for the user device 101 and/or user history information, such as information regarding previous activities of the user/user device 101 with respect to the requested application/service. The authentication processing module 305, at step 411, then analyzes the location information and user history information against corresponding information for authorized users stored in the user context enablers database 104, and determines whether the user is authorized to access the requested application/service. As explained above, for additional levels of security in the user authentication process, in further embodiments, at step 413, the information retrieval module 303 acquires media information, for example, regarding current events, and the authentication processing module 305 mashes up the location information with the media information to determine whether the location information corresponds with a current event, whereby the nature of the event indicates or substantiates the user's access of the requested application/service. For example, where the location information indicates that the user/user device 101 are within the vicinity of or heading towards a disaster area (e.g., an area recently affected by a hurricane or tornado), and the user is attempting to access the government emergency telecommunications services (GETS) system. Additionally, the user history information might indicate that the user has previously accessed the GETS system under similar circumstances. The authentication processing module 305, at step 415, in turn analyzes the mashed-up location information, and determines whether the user is authorized to access the requested application/service.

Referring next to FIG. 4B, again if the user authentication fails at step 415, or if further levels of user authentication are required, then in a further embodiment, at step 417, the authentication processing module 305 performs a passive authentication (still not requiring any authentication-specific engagement with the user) by, for example, performing a background voice recognition and/or voice biometric process, using voice records from the user context enablers database 104. In step 419, process 400 determines whether the user is authorized based on the passive authentication.

Thereafter, if prior steps in the authentication process have not resulted in an authorization determination (e.g., where the user context enablers database 104 lacks sufficient data for authentication of the particular user), at step 421, the authentication processing module 305 may perform an active user authentication through a challenge and response, such as a user identifier/identification (ID) and password. At this point, authorization is determined once again in view of the challenge and response (step 423). If the user is not authorized, then access is denied, per step 425.

In the event that any of the foregoing user authentication steps results in the authentication of the user/user device 101, then the authentication platform 103 would initiate the establishment, per step 427, of the requested communication session through the session control module 117. Additionally, in a further embodiment, the authentication processing module 305 accesses specific user information from the authorization database 105 to determine specific authorization parameters regarding the particular services that the authenticated user is authorized to access. The specific authorization parameters may include a level of access for the user with respect to the requested network application/service, security clearance level, network access rights (such as user or administrator rights), etc., for the authenticated user. The authorization parameters may be used to configure the specific access and enabled functionality for the user's access to the requested network application/service. Accordingly, such parameters may be used for set-up of the communication session and/or passed to the respective application/service platform 123 for configuration of the user access to the requested application/service.

The above process, according to certain embodiments, advantageously provides an automated user authentication process, for access to network services of a service provider intelligent network, through a priority communication session, with minimized user interaction.

The processes described herein, which provides for an automated user authentication process, for access to network services of a service provider intelligent network, with minimized user interaction, may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 5 is a diagram of a computer system that can be used to implement various exemplary embodiments. The computer system 500 includes a bus 501 or other communication mechanism for communicating information and one or more processors (of which one is shown) 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for adjusting cursor movement on the display 511.

According to an embodiment of the invention, the processes described herein are performed by the computer system 500, in response to the processor 503 executing an arrangement of instructions contained in main memory 505.

Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 either use electrical, electromagnetic or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to computer-readable storage medium (non-transitory—e.g., non-volatile media and volatile media), and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 6:
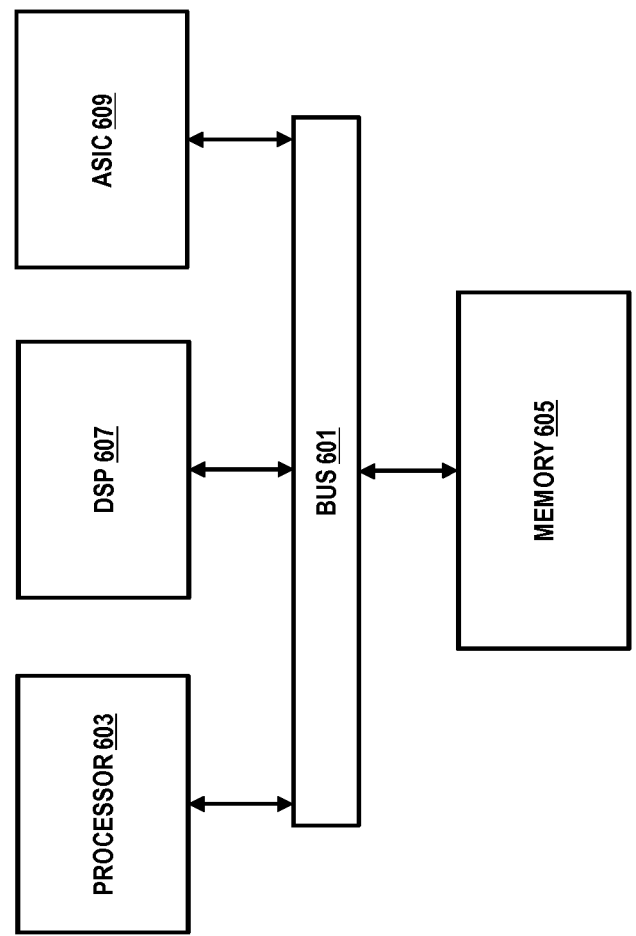
FIG. 6 is a diagram of a chip set that can be used to implement various exemplary embodiments.

FIG. 6 illustrates a chip set or chip 600 upon which an embodiment of the invention may be implemented. Chip set 600 is programmed to provide for automatic user authentication for access to network services of a service provider intelligent network, with minimized user interaction, as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of authenticating respective members engaged in a web-based transaction without compromising the integrity or anonymity of respective members.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to authenticate respective members engaged in a web-based transaction without compromising the integrity or anonymity of respective members. The memory 605 also stores the data associated with or generated from execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    receiving a session request for establishing a priority communication session over a data network with a user device;
    determining network information and device information associated with the session request and the user device, respectively;
    determining user history information regarding one or more prior communication sessions of a user of the user device; and
    authenticating the user using the network information, the device information, and the user history information for establishing the priority communication session.

2. A method according to claim 1, further comprising:
    determining location information for the user device,
    wherein the authentication of the user is further based on the location information.

3. A method according to claim 2, further comprising:
    acquiring media information relating to the priority communication session; and
    mashing up the media information with the network information, the device information, the location information, and the user history information,
    wherein the authentication of the user is based on the mashed up media information.

4. A method according to claim 3, wherein the media information relates to a current event, and wherein the method further comprises:
    mashing up the media information with the location information to determine that the user is within a vicinity of the current event or heading towards the vicinity of the current event,
    wherein the authentication of the user is based on the mashed up media information with the location information.

5. A method according to claim 1, further comprising:
    performing a passive authentication of the user using a voice recognition and/or voice biometric function.

6. A method according to claim 1, further comprising:
    presenting a challenge to the user; and
    receiving a challenge response from the user,
    wherein the authentication of the user is further based on the challenge response.

7. A method according to claim 6, wherein the challenge response includes a spoken response of the user, and wherein the method further comprises:
    performing a voice recognition and/or voice biometric function based on the spoken response,
    wherein the authentication of the user is based on a result of the voice recognition and/or voice biometric function.

8. A method according to claim 1, wherein the priority communications session includes an emergency communications session for an emergency service.

9. A method according to claim 8, wherein the emergency service includes one of a personal emergency response service or a government emergency telecommunications service.

10. An apparatus comprising:
    at least one processor; and
    at least one memory including computer program code for one or more programs,
    the at least one memory and the computer program code configured to, with the at least one processor, cause the apparatus to perform at least the following,
    receive a session request for establishing a priority communication session over a data network with a user device,
    determine network information and device information associated with the session request and the user device, respectively,
    determine user history information regarding one or more prior communication sessions of a user of the user device, and
    authenticate the user using the network information, the device information, and the user history information for establishing the priority communication session.

11. An apparatus according to claim 10, wherein the apparatus is further caused to:
    determine location information for the user device,
    wherein the authentication of the user is further based on the location information.

12. An apparatus according to claim 11, wherein the apparatus is further caused to:
  acquire media information relating to the priority communication session; and
  mash up the media information with network information, the device information, the location information, and the user history information,
  wherein the authentication of the user is based on the mashed up media information.

13. An apparatus according to claim 12, wherein the media information relates to a current event, and wherein the apparatus is further caused to:
  mash up the media information with the location information to determine that the user is within a vicinity of the current event or heading towards the vicinity of the current event,
  wherein the authentication of the user is based on the mashed up media information with the location information.

14. An apparatus according to claim 10, wherein the apparatus is further caused to:
  perform a passive authentication of the user using a voice recognition and/or voice biometric function.

15. An apparatus according to claim 10, wherein the apparatus is further caused to:
  present a challenge to the user; and
  receive a challenge response from the user,
  wherein the authentication of the user is further based on the challenge response.

16. An apparatus according to claim 15, wherein the challenge response includes a spoken response of the user, and wherein the apparatus is further caused to:
  perform a voice recognition and/or voice biometric function based on the spoken response,
  wherein the authentication of the user is based on a result of the voice recognition and/or voice biometric function.

17. An apparatus according to claim 10, wherein the priority communications session includes an emergency communications session for an emergency service.

18. An apparatus according to claim 17, wherein the emergency service includes one of a personal emergency response service or a government emergency telecommunications service.

19. A system comprising:
  a service platform configured to provide one or more services over a data network; and
  an authentication platform configured to authenticate a user of a user device,
  the authentication platform including:
  at least one processor; and
  at least one memory including computer program code for one or more programs,
  the at least one memory and the computer program code configured to, with the at least one processor, cause the system to perform at least the following,
    receive a session request for a priority communication session between the user device and the service platform;
    determine network information and device information associated with the session request and the user device, respectively;
    determine user history information regarding one or more prior communication sessions of the user; and
    authenticate the user using the network information and the device information, and the user history information, for establishing the priority communication session.

20. A system according to claim 19, wherein the system is further caused to:
  determine location information for the user device;
  acquire media information relating to the priority communication session; and
  mash up the media information with network information, the device information, the location information, and the user history information,
  wherein the authentication of the user is based on the mashed up media information.

* * * * *